United States Patent [19]

Ledieu

[11] Patent Number: 5,671,205
[45] Date of Patent: Sep. 23, 1997

[54] COMPACT DISC COMPRISING AN ANTIPIRACY MARKING AND METHOD OF PROVIDING COMPACT DISCS WITH AN ANTIPIRACY MARKING

[75] Inventor: Jean Ledieu, Crespieres, France

[73] Assignee: Digipress, Caen, France

[21] Appl. No.: 533,989

[22] Filed: Sep. 27, 1995

[30] Foreign Application Priority Data

Sep. 28, 1994 [FR] France ................... 94 11589

[51] Int. Cl.⁶ ................... G11B 7/00; B29D 11/00
[52] U.S. Cl. .............. 369/103; 264/1.33; 264/1.36; 369/273; 425/810
[58] Field of Search ................ 264/1.31, 1.33, 264/106, 107, 1.36; 425/385, 542, 810; 369/272, 273, 275.1, 275.3; 360/135

[56] References Cited

U.S. PATENT DOCUMENTS

| | | | |
|---|---|---|---|
| 3,689,078 | 9/1972 | Ban | 369/273 |
| 4,223,050 | 9/1980 | Nyfeler et al. | 264/1.31 |
| 5,003,915 | 4/1991 | D'Amato et al. | 264/1.31 |
| 5,189,531 | 2/1993 | Palmer et al. | 264/1.31 |
| 5,293,373 | 3/1994 | Toide et al. | 369/275.5 |
| 5,346,654 | 9/1994 | Kodaka et al. | 264/1.33 |
| 5,452,282 | 9/1995 | Abraham | 369/273 |
| 5,533,002 | 7/1996 | Abraham | 3369/275.3 |
| 5,538,773 | 7/1996 | Kondo | 369/273 |

FOREIGN PATENT DOCUMENTS

| | | |
|---|---|---|
| 0374256 | 6/1990 | European Pat. Off. . |
| 2660474 | 10/1991 | France . |
| 2702077 | 9/1994 | France . |
| 2250626 | 6/1992 | United Kingdom . |

*Primary Examiner*—Mathieu D. Vargot
*Attorney, Agent, or Firm*—Leydig, Voit & Mayer, Ltd.

[57] ABSTRACT

A method for providing compact discs with an antipiracy marking and a mold for pressing compact discs for making compact discs carrying an antipiracy marking as well as compact discs comprising an antipiracy marking pattern, the compact disc consisting of a substrate including on one of its sides the information to be read by the compact disc player and on the opposite side an antipiracy marking pattern.

10 Claims, 1 Drawing Sheet

COMPACT DISC COMPRISING AN ANTIPIRACY MARKING AND METHOD OF PROVIDING COMPACT DISCS WITH AN ANTIPIRACY MARKING

BACKGROUND OF THE INVENTION

The invention relates to a compact disc comprising an antipiracy marking. It also relates to a pressing mold and to a method for manufacturing such a compact disc.

Presently to distinguish an original from its non-authorized copy, different codes may be set upon the compact disc.

The most widespread practice consists in incorporating either in clear or as bar codes, one or several codes into the identification band of the compact disc. These codes may express the reference of the editor, the reference of the company having carried out the mastering (manufacture of the master disc and/or of the pressing die) and the reference of the company having carried out the pressing and this in accordance with the place or space available on this identification band and the agreements entered between the different intervening parties.

This type of marking which is technically carried out during the mastering operation has the inconvenience of being easily counterfeited by pirating companies. To fight against this situation, the IFPI has recommended the use of complementary codes so-called SID-Codes which are generally set or put on between the programme or information-carrying area and the identification band. These SID-Codes may be put or set on at two stages:

During the mastering step: the SID-Code may be automatically generated by a ROM (read-only memory) considered to be inviolable, the content of which would represent the identification code of the mastering machine.

During the pressing step: it may then be engraved directly onto the mold of the press and thereby automatically transferred upon each pressed compact disc. This pressing SID-Code being engraved onto one expensive mechanical element would thus acquire the reputation of also being inviolable.

In any case whether the identification band or the SID-Codes set on during the mastering and pressing steps are involved, these codes have a small size since they may by no means be so located as to cover the surface used for the programme or information-carrying area. This makes the information difficult to be read and to be interpreted. Thus the final consumer or user very seldomly is able to recognize at first sight the origin of the compact discs he buys either because this information is not visible once the compact disc has been packed or because the codes are too hermetic.

SUMMARY OF THE INVENTION

The invention aims at coping with these inconveniences by proposing a compact disc comprising an antipiracy marking which allows the consumer to check the authenticity of a compact disc when purchasing the latter.

It also proposes a method of antipiracy marking which combines the advantage of a technically sophisticated feasibility or workability hence difficult to be copied by pirates with the advantage of not adversely affecting the cost of the manufacture of the master disc from the pressing die as well as the cost of pressing compact discs, once it has been put in use. Moreover this method provides a more elaborate antipiracy marking design or pattern which is very difficult to copy.

This antipiracy marking pattern or design could be specific to the to the manufacturer and/or to the compact disc pressing mold.

The invention also proposes a compact disc pressing mold for pressing compact discs comprising an antipiracy marking.

For that purpose the invention provides a compact disc consisting of a substrate comprising on one of its sides micropits representative of the programme and on the opposite side an optical grating consisting of micropits and/or microreliefs or micro-embossings reflecting the wavelenghts of the visible light and representing the antipiracy marking design or pattern in clear.

According to one characterizing feature of the compact disc of the invention, the optical grating covers the whole surface of one side of the compact.

The invention also provides an injection press mold for compact discs comprising an optical grating consisting of microreliefs and/or micropits, which is reflecting for the wavelengths of visible light, engraved onto its mirror block side opposite to the programme die, the said grating constituting a design or pattern representative of an antipiracy marking.

The invention further proposes a method of providing compact discs with an antipiracy marking, comprising a step of transferring, during the pressing of the compact disc and upon the side opposite to the side comprising the programme, an antipiracy marking design or pattern, the design or pattern forming an optical grating consisting of micropits and/or microreliefs or micro-embossings reflecting the wavelengths of the visible light.

According to one characterizing feature of the method of the invention, the transfer is carried out upon the entire aforesaid opposite side.

According to a first variant of the method of the invention, the antipiracy marking may be engraved in negative form onto the mirror block opposite to the programme die of the injection press mold for compact discs before proceeding with the transfer step.

According to another variant of the method of the invention, the antipiracy pattern may be engraved onto the substrate of a die which will be removably fastened onto the mirror block, opposite to the programme die of the press for compact discs before performing the transfer step.

According to a first embodiment of the varients of the method of the invention, the step of engraving the mirror block of the mold or of the substrate of the die comprises the steps of:

depositing onto the mirror block or onto the substrate a layer of photosensitive resin of the positive type, recording the antipiracy marking pattern specific to a given manufacturer into this layer of photosensitive resin, removal of the irradiated areas of this photosensitive resin, transfer of the antipiracy marking into the mirror block or the substrate of the die by engraving of this block or of this substrate in those areas which are no longer covered by the photosensitive resin, and removal of all the residual resin.

According to a second embodiment of the varients of the method of the invention, the step of engraving of the mirror block or of the substrate of the die comprises the steps of:

depositing upon the said mirror block or upon the said substrate of the said die a layer of photosensitive resin of the negative type, recording the said antipiracy marking pattern into this layer of photosensitive resin, removal of the non-irradiated areas of photosensitive resin, transfer of the antipiracy marking pattern into the mirror block or the substrate of the die by engraving the mirror block or the substrate in those areas which are no longer covered with photosensitive resin, and removal of all the residual resin.

BRIEF DESCRIPTION OF THE DRAWINGS

The invention will be better understood and further objects, characterizing features, details and advantages thereof will appear more clearly when reading the following detailed description thereof with reference to the accompanying diagrammatic drawings given by way of non-limiting example only illustrating a specific presently preferred embodiment of the invention and in which.

On these figures, the axis denoted X—X represents the axis of rotation of these compact discs.

DETAILED DESCRIPTION OF THE PREFERRED EMBODIMENTS

Figure 1:
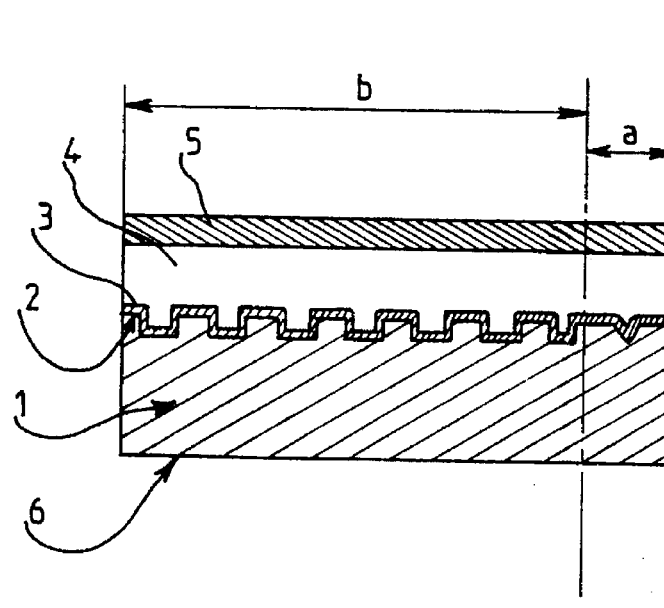
FIG. 1 shows a diagrammatic view in cross-section of one half compact disc of the prior art.

As seen on FIG. 1, the compact disc of the prior art consists of a substrate 1 transparent in the range of the wavelengths emitted by the laser diode of the compact disc player and in the range of the wavelengths of the visible light and generally made from polycarbonate, comprising on its side 2 in the area denoted b and referred to as programme area hereinafter, a series of micropits representative of the programme, i.e. of the information to be read by the compact disc player in the central area of side 2 denoted a, a code peculiar to a pressing die and/or to a given pressing machine is provided.

The entirety of this side 2 is covered with a layer 3 made from a material reflecting in the range of the wavelengths emitted by the laser diode of the compact disc player, the layer 3 being itself covered with a protective layer 4 generally made from epoxy resin.

At last, a label 5 comprising information in clear enabling the consumer to identify the nature of the programme is deposited upon the protective layer 4.

In the compact disc of the prior art, the side 6 opposite to the side 2 comprises no information readable either with the naked eye or through a compact disc player in the programme area.

As seen from the foregoing, the space available in the area a which is reserved for the authentification code of the compact disc does not allow to use characters of a size sufficient to be easily readable with the naked eye and/or to provide a more elaborate graphic style which would be more difficult to be reproduced.

Figure 2:
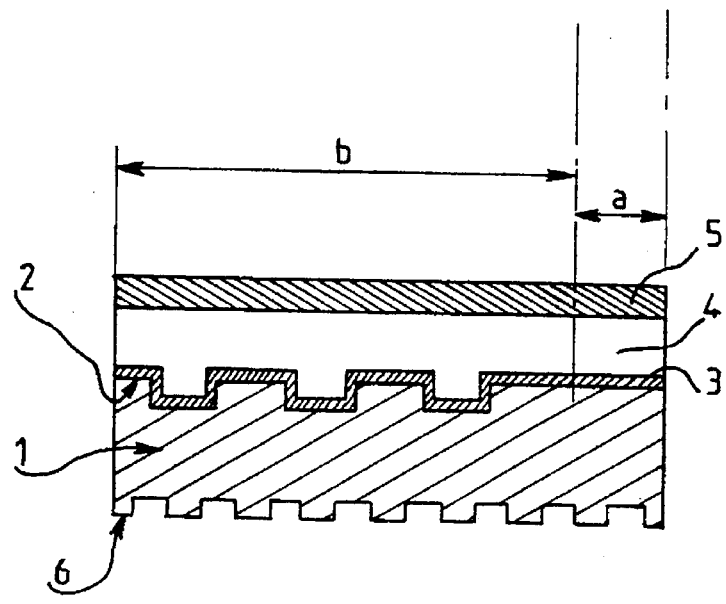
FIG. 2 shows a diagrammatic view in cross-section of one half compact disc according to the invention.

In contrast to the compact disc of the prior art and as illustrated on FIG. 2, the antipiracy marking is provided by the creation of micropits and/or microreliefs reflecting the wavelengths of the visible light on the side 6 of the compact disc opposite to the side 2 comprising the programme. This antipiracy marking may represent a specific pattern or design and constitute an optical grating or a plurality of optical gratings which would not disturb the reading of the programme itself.

For that purpose, the size, the pitch, the depth or the thickness of the micropits and/or microreliefs constituting the optical grating(s) and diffracting the wavelengths of the visible light should be computed so as to maximize the optical effect for the human eye without affecting the zero order of the laser beam for reading the programme pressed upon the side 2 of the compact disc. The principle of the non-disturbance at the 0 order of the laser beam for reading the programme has already been demonstrated in other respects and will not be dealt with again here.

In the following, the words "optical grating" designate one single optical grating as well as a plurality of optical gratings.

Here the pitch of the grating forming the antipiracy marking should preferably lie between about 700 nm and about 1600 nm, the size of the micropits and/or of the microreliefs constituting the gratings should lie between about 300 nm and about 2,000 nm and the depth of the micropits and/or the thickness of the microreliefs should lie between about 50 nm and about 200 nm.

With this grating being provided on the face 6 opposite to that comprising the programme, the whole surface of this face 6 is available to contain an antipiracy marking pattern or design of a size sufficient to be readable and identifiable by the average consumer. Thus a graphic style more elaborate than a simple sequence of letters and/or of figures, such as, for example, a logotype etc . . . may be provided.

In order to enable the consumer to check the authenticity of the compact disc upon purchasing, without opening the case and the packing wrapping, the side 6 thus marked could be made visible from the outside for example by the use of a transparent case.

In order to improve the readability of this antipiracy marking, which readability is disturbed by the defocused presence of the layer 3 of reflecting material, one may advantageously introduce into the material constituting the substrate of the compact disc, a coloring material transparent to the wavelengths emitted by the reading laser beam and relatively opaque to the human eye.

The compact disc of the invention is obtained by pressing in an injection press, during which pressing the antipiracy marking pattern is transferred onto the face 6 of the compact disc at the same time as the programme.

The conventional process of manufacture of compact discs consists at first in providing a die usually made from nickel, comprising the programme to be subsequently read, referred to here as programme die, placing this die upon one of the faces of an injection press mold and then pressing the compact disc proper.

In this process, that face so-called mirror block which is opposite to that onto which the programme die is secured, is smooth.

To provide the programme die, all the known techniques are applicable.

One of them consists in depositing upon a substrate made generally from glass a layer of resin sensitive to a constraint, recording the programme into this resin layer by applying the suitable constraint, developing the sensitive resin by removal of the converted areas and then transferring the programme into the substrate by plasma engraving or chemical etching into the substrate. The residual resin areas are then removed. The resin may be a photosensitive resin in which case the constraint is a light beam either modulated in accordance with the programme to be recorded or applied through a mask representative of the programme. One has then obtained a master disc which after a galvanoplasty or electroplating operation known per se leads to the die proper.

Contrary to this prior art and in a first embodiment of the compact disc of the invention, the antipiracy marking pattern will be engraved onto the mirror block, opposite to the programme die, of each injection press for compact discs.

In a second embodiment of the invention, this antipiracy marking pattern will not be engraved directly onto the mirror block opposite to the programme die but onto a second die which will be removably fastened by any suitable means onto this same mirror block.

In order to make the subject of the invention better understandable, several embodiments of practising the present invention will now be described by way of merely illustrative and non-limiting examples only.

EXAMPLE 1

A layer of photosensitive resin of the negative type is deposited upon the whole useful surface of the mirror block of an injection press mold. The pattern or design representative of the antipiracy marking is recorded by irradiation through a mask into this layer of photosensitive resin. It could also be recorded through sequential irradiation on a mastering machine. Then the photosensitive resin is developed through removal of the non-irradiated areas.

The pattern representing the antipiracy marking in the negative form is then transferred through engraving into the mirror block of the injection press mold down to a depth of 50 nm.

Thus has been obtained a mold according to the invention, i.e. a mold on the mirror block of which the antipiracy marking pattern is represented by the series of microreliefs thus obtained. The size of the microreliefs varies from 300 to 2,000 nm. The series of microreliefs constitutes an optical grating reflecting the wavelengths of the visible light and having a pitch of 1,600 nm.

The programme die is then placed upon the face opposite to the mirror block of the pressing mold and one injects polycarbonate under pressure to which has been added a coloring matter transparent to the wavelength of the reading laser beam of the compact disc player but relatively opaque to the human eye.

One then proceeds with the depositing of a layer of reflecting material, of a protective layer and of a label.

This embodiment is particularly advantageous since it is easier to mold hollows than reliefs.

The compact disc thus obtained is illustrated in FIG. 2 and comprises a substrate 1 made from polycarbonate, the polycarbonate including the coloring matter previously described. The compact disc comprises on its face 2 a series of micropits reflecting the wavelenghts emitted by the reading laser diode of the compact disc player and representative of the information to be read subsequently. The face 2 is covered with a layer 3 of reflecting material and may be additionally covered with a protective layer 4 and with a label 5. The surface of the face 6 opposite to the face 2 includes a series of micropits representative of the antipiracy marking pattern and constituting an optical grating of micropits reflecting the wavelengths of the visible light without affecting the 0 order of the beam emitted by the reading laser diode.

This pattern is perfectly readable to the naked eye in view not only of the presence of the coloring matter within the substrate but also of its size.

EXAMPLE 2

There is proceeded in the same manner as in Example 1 except that the resin used is a photosensitive resin of the positive type. In this example the irradiated areas of this resin which are removed. The engraving of the mirror block is performed down to a depth of 200 nm.

The mold thus obtained then comprises a pattern representative of the antipiracy marking on its mirror block. The pattern consists of a series of micropits constituting an optical grating, the optical grating having a pitch of 700 nm. The micropits have a depth of 200 nm and reflect the wavelengths of visible light. The following steps are identical with those described in Example 1.

Thus is obtained a compact disc according to the invention, illustrated in FIG. 2 and consisting of a substrate 1 made from colored polycarbonate, comprising on its face 2 a series of micropits representative of the information to be read by the compact disc player (programme), which face 2 is covered with the layer 3 of reflecting material and possibly with a protective layer 4 and with a label 5. The face 6 opposite to this face 2 of the compact disc of the invention comprises a series of microreliefs with a thickness of 200 nm representative of the antipiracy marking pattern and constituting a grating of microreliefs reflecting the wavelengths of visible light and covering the whole surface of this face.

EXAMPLE 3 and 4

In these Examples, the compact discs and the mold for pressing compact discs according to the invention are obtained according to the processes described in Examples 1 and 2, respectively, except that the addition of coloring matter to the polycarbonate constituting the substrate of the compact disc has been omitted.

In Examples 1 to 4, since the engraving of the mirror block of the mold for pressing compact discs is very difficult to be carried out and technically sophisticated, it cannot be easily performed by a pirate, thereby imparting to this method of antipiracy marking a strong safe guard against copying.

However once to engraving of the mirror block of the injection press mold has been carried out, the manufacturing cost of the master disc and of the compact disc pressing die as well as the cost of the compact disc pressing itself are not significantly affected.

EXAMPLE 5

A die comprising a series of micropits with a depth of 150 nm and having a size lying between 50 and 200 nm and constituting an optical grating with a pitch of 700 nm, which micropits reflect wavelengths emitted in the range of visible light and representative of the desired antipiracy marking pattern is at first provided by any known process as for the manufacture previously described of the programme die.

Then this die so-called antipiracy marking die is removably secured to the mirror block of the compact disc pressing mold by any suitable means.

The next steps are identical with those described in Example 1.

One thus obtains a compact disc according to the invention.

EXAMPLE 6

There is provided an antipiracy marking die comprising a series of microreliefs with a thickness of 100 nm, which microreliefs constitute an optical grating reflecting the wavelengths of the range of the visible light and representative of the antipiracy marking pattern.

The further steps are identical with those described in Example 5 and in Example 1.

One has thus obtained a compact disc according to the invention.

EXAMPLE 7 and 8

Upon performing the procedures described in Examples 5 and 6, respectively, except that the step of addition of coloring matter to the polycarbonate constituting the substrate of the compact disc, compact discs according to the invention are obtained.

In Examples 5 to 8 since the antipiracy marking pattern is engraved onto a removable die, the method of antipiracy marking according to the invention is usable with a greater flexibility by the manufacturer of compact discs.

The invention is of course not at all limited to the embodiments described and illustrated which have been given by way of example only.

Thus the substrate of the compact disc could consist of any suitable material transparent in the range of the wavelengths emitted by the reading diode. Likewise the antipiracy marking pattern could cover some areas of the face opposite to that comprising the programme.

This means that the invention comprises all the technical equivalents of the means described as well as their combinations if the latter are carried out according to its gist and within the scope of the appended claims.

What is claimed is:

1. A compact disc comprising a substrate having first and second opposing sides, the first side including program micropits representative of information to be read by a compact disc player, the second side including micropits and/or microreliefs reflecting wavelengths of visible light, the micropits and/or microreliefs being representative of an antipiracy marking pattern and constituting an optical grating.

2. A compact disc according to claim 1, wherein the optical grating covers the whole surface of the opposite side.

3. A method of providing a compact disc with an antipiracy marking comprising:

pressing program information on a first side of the compact disc; and simultaneously transferring an antipiracy marking pattern including an optical grating consisting of micropits and/or of microreliefs reflecting the wavelengths of visible light onto a second side of the compact disc.

4. A method according to claim 3, wherein the antipiracy marking is transferred to the entire surface of the second side.

5. A method according to claim 3, further comprising engraving the antipiracy marking pattern in negative form onto a mirror block of an injection press mold, opposite to a program die of the injection press mold, before carrying out the transfer step.

6. A method according to claim 3, further comprising engraving the antipiracy marking pattern into the substrate of a die and fastening the die onto a mirror block of an injection press mold opposite to a program die of the injection press mold prior to proceeding with the transferring step.

7. A method according to claim 5, wherein the step of engraving the mirror block of the injection press mold includes:

depositing a layer of photosensitive resin of the positive type on the mirror block, recording the antipiracy marking pattern into the layer of photosensitive resin, removing irradiated areas of the photosensitive resin, transferring the antipiracy marking pattern into the mirror block by engraving of the mirror block in areas which are no longer covered with the photosensitive resin, and removing all the residual resin.

8. A method according to claim 5, wherein the step of engraving of the mirror block includes:

depositing a layer of photosensitive resin of the negative type on the mirror block, recording the antipiracy marking pattern into the layer of photosensitive resin, removing non-irradiated zones from the photosensitive resin, transferring the antipiracy marking pattern into the mirror block by engraving of the mirror block in areas which are no longer covered with the photosensitive resin, and removing all the residual resin.

9. A method according to claim 4 further comprising injecting a coloring material into a substrate of the compact disc, the coloring material being transparent to wavelengths emitted by reading laser beams and substantially opaque to a human eye.

10. A compact disc according to claim 1 wherein said substrate includes a coloring material, the coloring material being transparent to wavelengths of light emitted by reading laser beams and substantially opaque to a human eye.

* * * * *

UNITED STATES PATENT AND TRADEMARK OFFICE
CERTIFICATE OF CORRECTION

PATENT NO.    : 5,671,205
DATED         : September 23, 1997
INVENTOR(S)   : LEDIEU It is certified that error appears in the above-indentified patent and that said Letters Patent is hereby corrected as shown below:

Column 7, Line 37, change "opposite" to --second--;

Signed and Sealed this

Thirty-first Day of March, 1998

Attest:

BRUCE LEHMAN

Attesting Officer        Commissioner of Patents and Trademarks